United States Patent [19]
Divecha et al.

[11] Patent Number: 6,019,081
[45] Date of Patent: Feb. 1, 2000

[54] COOLED PRE-COMBUSTION CHAMBER ASSEMBLY

[75] Inventors: Devang D. Divecha; Geoffrey D. Ginzel, both of Lafayette, Ind.

[73] Assignee: Caterpillar Inc., Peoria, Ill.

[21] Appl. No.: 09/164,951

[22] Filed: Oct. 1, 1998

[51] Int. Cl.$^7$ ................................................ F02B 19/16
[52] U.S. Cl. ........................................ 123/254; 123/41.32
[58] Field of Search ................................ 123/254, 256, 123/266, 267, 268, 41.32

[56] References Cited

U.S. PATENT DOCUMENTS

| | | | |
|---|---|---|---|
| 1,539,133 | 5/1925 | Markle et al. | 123/41.32 |
| 4,303,045 | 12/1981 | Austin, Jr. | 123/266 |
| 4,892,070 | 1/1990 | Kuhnert | 123/274 |
| 5,222,993 | 6/1993 | Crane | 123/256 |
| 5,554,908 | 9/1996 | Kuhnert et al. | 313/140 |
| 5,662,082 | 9/1997 | Black et al. | 123/254 |

FOREIGN PATENT DOCUMENTS

| | | | |
|---|---|---|---|
| 10-47096 | 7/1996 | Japan | F02D 19/02 |

*Primary Examiner*—Willis R. Wolfe
*Assistant Examiner*—Hieu T. Vo
*Attorney, Agent, or Firm*—Alan J. Hickman

[57] ABSTRACT

A sparkplug cooling passageway is disposed in a second body portion of the cooled pre-combustion chamber assembly. The sparkplug cooling passageway has a first side surface spaced about a threaded bore portion disposed in the second body portion. The first side surface and a second side surface define the sides of the sparkplug cooling passageway. An opening disposed in the second body portion opens into the passageway at the second side surface and passes cooling fluid between a cylinder head and the passageway.

13 Claims, 4 Drawing Sheets

Fig. - 1 -
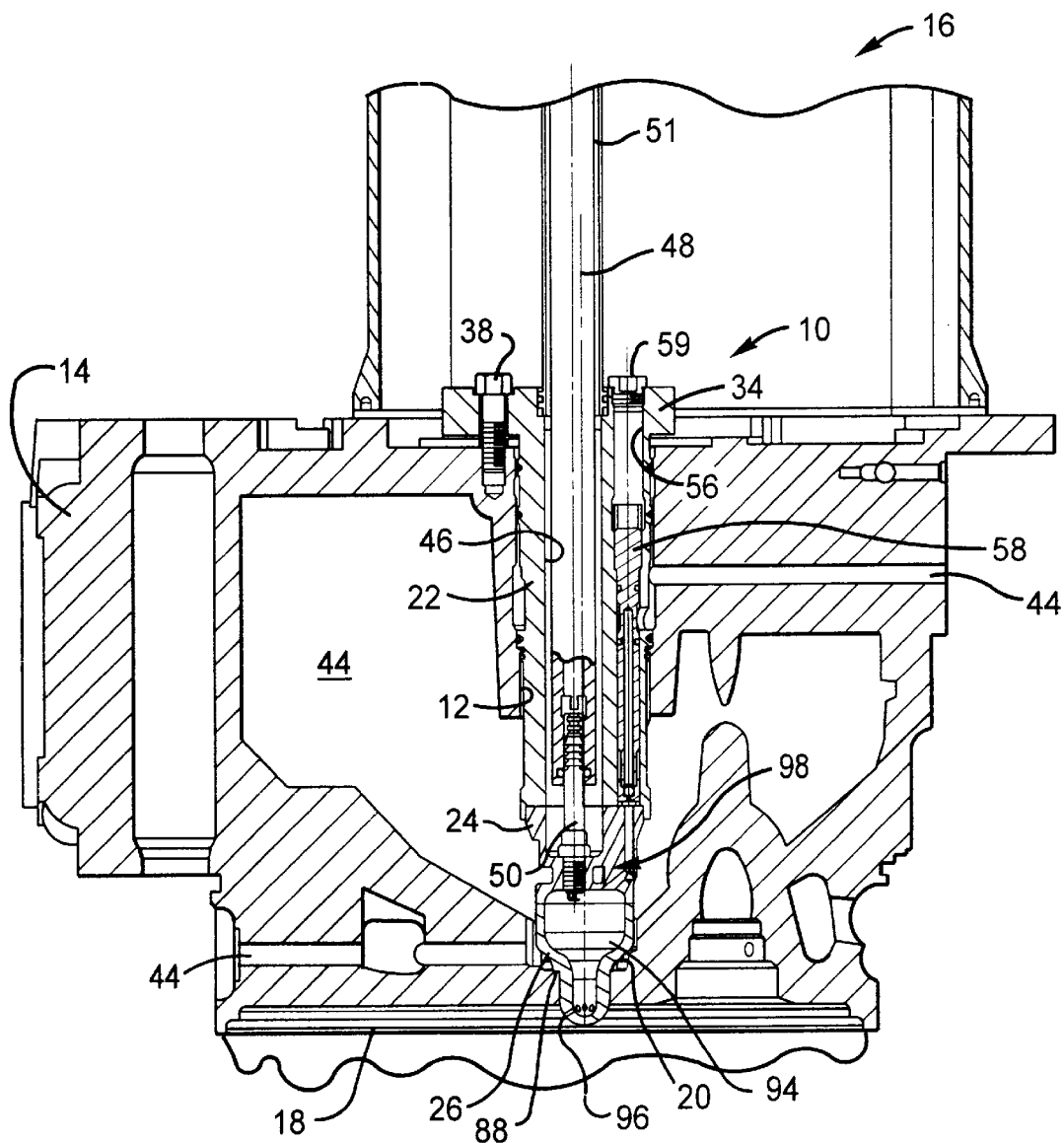

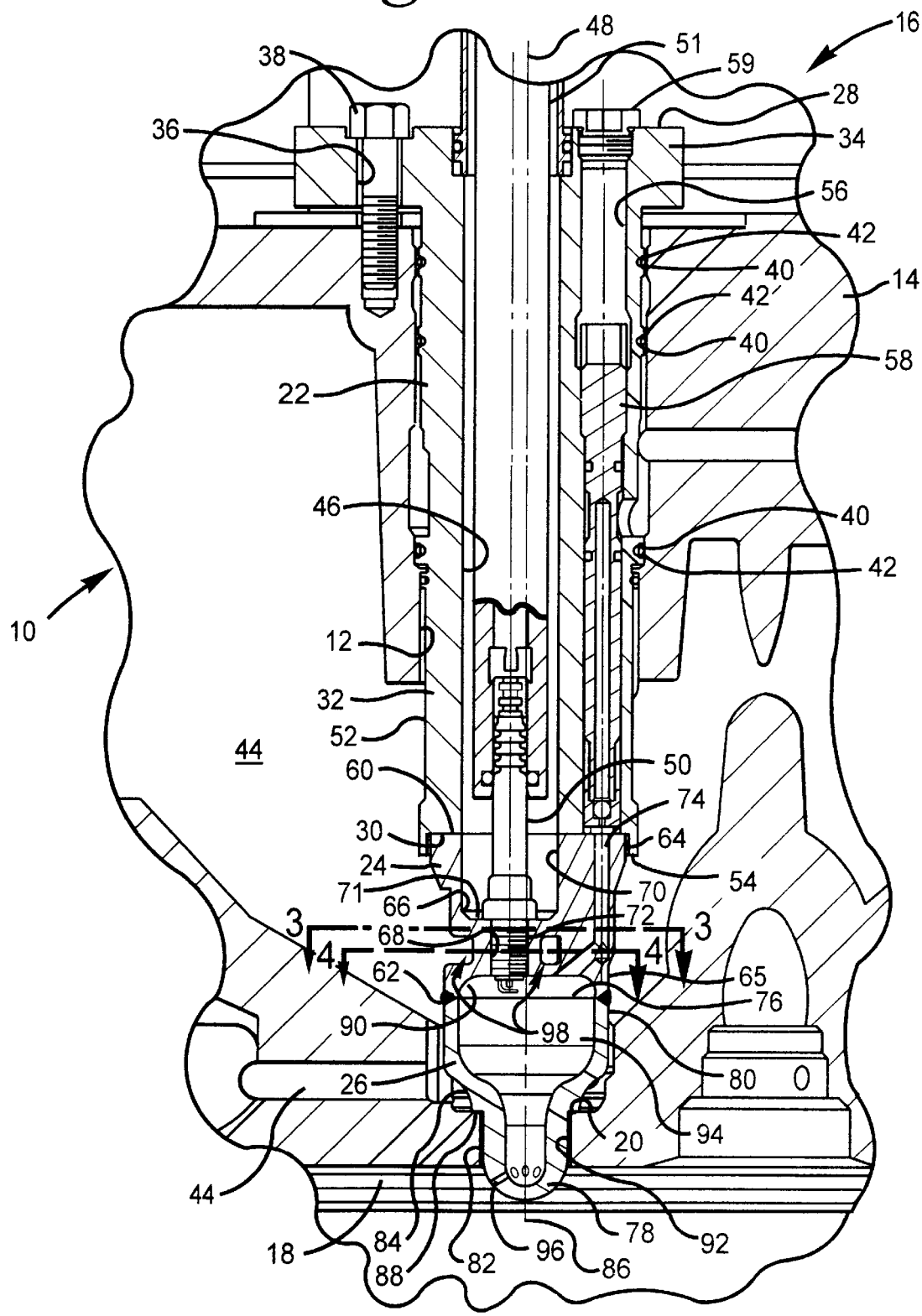
Fig. - 2 -

Fig. - 3 -
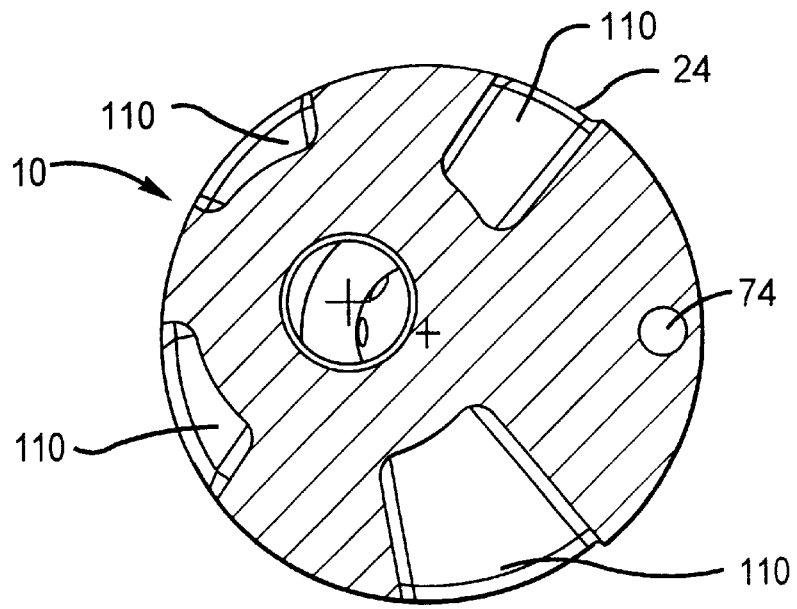
Fig. - 4 -
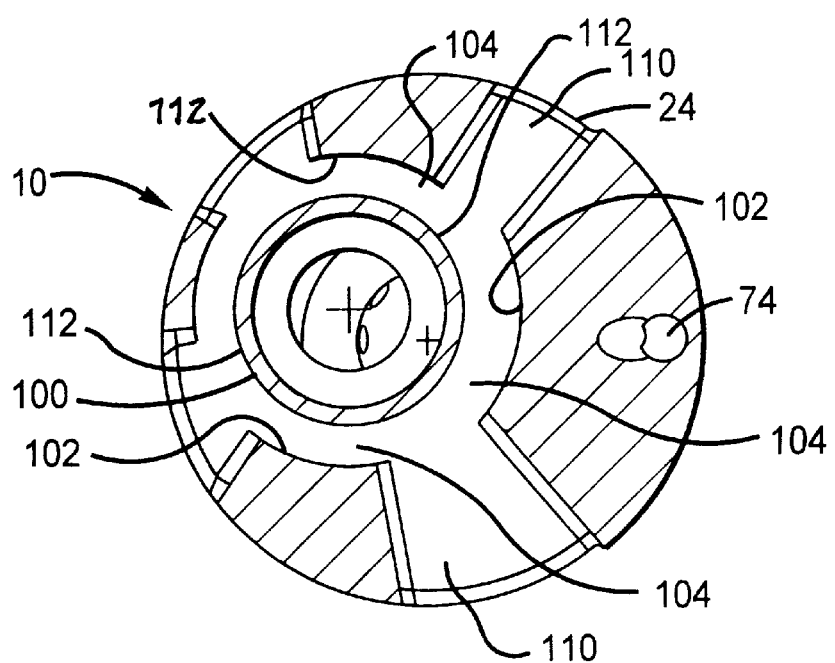

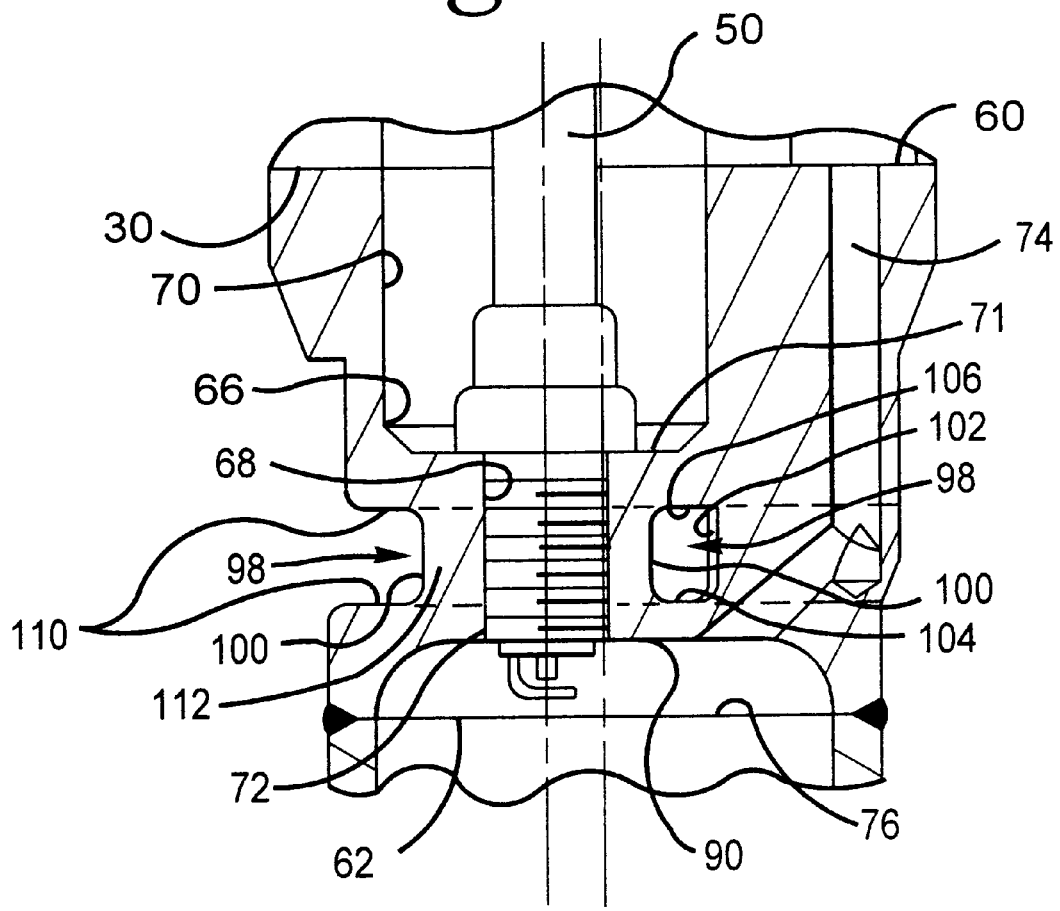
Fig. - 5 -

COOLED PRE-COMBUSTION CHAMBER ASSEMBLY

TECHNICAL FIELD

This invention relates to a pre-combustion chamber assembly and more particularly to a pre-combustion chamber assembly having a sparkplug cooling passageway.

BACKGROUND ART

Pre-combustion chamber assemblies have been used in internal combustion engines to ignite gaseous fuels for quite some time. Such pre-combustion chamber assemblies typically utilize a sparkplug to ignite the fuel and air mixture in a pre-combustion chamber located in the pre-combustion chamber assembly. The sparkplug is exposed to the pre-combustion chamber in order to ignite the fuel and air mixture injected therein. The temperature in the pre-combustion chamber is extremely hot which is detrimental to the life of the sparkplug. As a result frequent sparkplug replacement is necessary.

It would be beneficial to reduce the temperature of the pre-combustion chamber in order to increase the life of the sparkplug. However, such a reduction would be detrimental to combustion and internal combustion engine operation. Incomplete combustion would result in higher levels of nitrous oxide emissions and engine operating inefficiencies.

Attempts to reduce the temperature of the sparkplug in an area of the electrode of the sparkplug have been pursued. As a result the life of the sparkplug is short and internal engine downtime for replacement is frequent.

The present invention is directed at overcoming one or more of the problems set forth above.

DISCLOSURE OF THE INVENTION

In one aspect of the present invention, a cooled pre-combustion chamber assembly for an internal combustion engine has first, second and third body portions. The first body portion has a sparkplug receiving bore. The second body portion has a stepped bore. The stepped bore has a counter bore portion, a threaded bore portion and a longitudinal axis. The second body portion is axially aligned with the sparkplug receiving bore. The third body portion has a pre-combustion chamber. The second body portion is located between the first and third body portions and the stepped bore is open to the sparkplug receiving bore and the combustion chamber. A sparkplug cooling passageway is disposed in the second body portion at a predetermined radial location spaced from and about the threaded bore portion. The sparkplug cooling passageway is adapted to pass cooling fluid flow in close proximity relative to the threaded bore portion.

As a result, the sparkplug cooling passageway enables cooling fluid flow to pass within close proximity to the sparkplug threaded portion and thereby transfer heat from the sparkplug and increase the life of the sparkplug.

BRIEF DESCRIPTION OF THE DRAWINGS

FIG. 1 is a diagrammatic cross-sectional view of an embodiment of a cooled pre-combustion chamber assembly of the present invention shown installed in a cylinder head of an internal combustion engine;

FIG. 2 is a diagrammatic cross-sectional view of the cooled pre-combustion chamber assembly of FIG. 1 shown in greater detail;

FIG. 3 is a diagrammatic cross-sectional view taken along lines 3—3 of FIG. 2;

FIG. 4 is a diagrammatic cross-sectional view taken along lines 4—4 of FIG. 2; and FIG. 5 is a diagrammatic enlarged cross-sectional detail of the cooled pre-combustion chamber of FIG. 2 showing a second body portion in greater detail.

BEST MODE FOR CARRYING OUT THE INVENTION

With reference to the drawings, and particular FIGS. 1 and 2, a cooled pre-combustion chamber assembly 10 is shown disposed in a bore 12 in a cylinder head 14 of an internal combustion engine 16. The cooled pre-combustion chamber assembly 10 extends from the cylinder head 14 into a combustion chamber 18 of the internal combustion engine 16. A sealing surface 20 is provided in the cylinder head 14 to seal the combustion chamber 18 from cooling fluid disposed in cooling fluid passages 44 in the cylinder head 14.

As best seen in FIG. 2, the cooled pre-combustion chamber 10 has a first body portion 22, a second body portion 24 and a third body portion 26. The first body portion 22 has first and second ends 28,30 and a cylindrical body portion 32 located between the first and second ends 28,30. A collar portion 54 having a tubular like configuration extends axially from the second end 30. A flange 34 is provided at the first end 28 of the first body portion 22. The flange 34 has a pair of apertures 36 disposed therethrough for receiving a threaded fastener 38. The threaded fasteners 38 are screwthreadably connected to the cylinder head 14. The threaded fasteners 38 retain the cooled pre-combustion chamber assembly 10 in bore 12 in the cylinder head 14 and from rotary and axial movement relative to the bore 12.

The first body portion 22 also has a plurality of axially spaced apart annular grooves 40 disposed circumferentially about a cylindrical outer surface 52. The annular grooves 40 open radially outwardly and each receive an "O" ring seal 42. The "O" ring seals 42 each engage the cylinder head 14 at spaced apart axial locations in the bore 12 and seals the various cooling fluid passages 44 from fluid leakage thereby. The seals 42 are made of any suitable non-metallic "O" ring sealing material.

The first body portion 22 also has a sparkplug receiving bore 46 disposed therethrough and opening at the first and second ends 28,30 of the first body portion 22. The sparkplug receiving bore 46 is parallel to a longitudinal axis 48 of the first body 22 portion and radially offset therefrom. The sparkplug receiving bore 46 is of a diameter sufficient for receiving a sparkplug 50 having a sparkplug extender 51 and for permitting access to the sparkplug 50 for installation and removal purposes. The sparkplug 50 in the context of this invention means any suitable ignition device available in the art.

The first body portion 22 also has a check valve receiving bore 56 disposed therein. The check valve receiving bore 56 opens at the first and second ends 28,30 and is of a predetermined diameter sufficient to receive a check valve assembly 58 and a plug 59 at the first end 28. The check valve receiving bore 56 is substantially longitudinally parallel to the sparkplug receiving bore 46 and to the longitudinal central axis 48 of the first body portion 22. The first body portion 22 is preferably made of a ductile iron casting—pearlitic ferritic.

The second body portion 24 has a first end 60 and a second end 62, a first end portion 64 terminating at the first end 60 and a second end portion 65 terminating at the second end 62. The first and second end portions 64,65 are cylindrical. The first and second ends 60,62 are substantially parallel to each other and substantially perpendicular to the first end portion 64. The second body portion 24 is made of a stainless steel material capable of withstanding relatively high temperatures as compared to the lower temperature capabilities of the first body portion 22. Preferably a wrought stainless steel alloy, Type 347 is used. This alloy has excellent castability, weldability and is not hardenable through heat treatment. This material is particularly suitable for use between 800 and 1650 degrees Fahrenheit under stress, severe corrosion and vibration applications. The second body portion 24 is preferably cast to the general configuration and subsequently machined to final dimensions where required.

The second body portion 24 has a stepped bore 66 disposed therein. The stepped bore 66 opens at the first and second ends 60,62 and is adapted to receive the sparkplug 50. The stepped bore 66 has a threaded bore portion 68 and a counter-bore 70 portion. The threaded bore portion 68 screwthreadably receives the threaded end portion 72 of the sparkplug 50 and the counter-bore portion 70 is adapted to receive the sparkplug 50 with radial clearance. A sealing surface 71 is defined by a step located between the counter-bore portion 70 and the threaded bore portion 68. The sealing surface 71 is adapted to sealing engage the sparkplug 50. The counter-bore portion 70 and the threaded bore portion 68 are axially aligned. The second body portion 24 also has a fuel passing passageway 74 disposed therein and opening at the first and second ends 60,62. The fluid passing passageway 74 opens at the first end 60 of the second body portion 24 into the check valve receiving bore 56 and at the second end 30 of the first body portion 22. The threaded bore portion 68 opens at the sealing surface and a pre-combustion chamber end surface 90. The fuel passing passageway 74 also opens at the pre-combustion chamber end surface 90.

The third body portion 26 has a first end 76 and a spherical dome end portion 78 spaced from the first end 76. The third body portion 26 has a cylindrical first end portion 80 a, cylindrical second end portion 82 and a transition portion 84 located between the first and second end portions 80,82. The transition portion 84 provides a gradual transition and blending between the different diameters of the first and second cylindrical end portions 80,82. The dome end portion 78 ends at and is tangent to the second end portion 82. The first and second end portions 80,82, the transition portion 84 and the dome end portion 78 are disposed about a central axis 86.

A sealing surface 88 is disposed about the third body portion 26 at a predetermined location axially along the transition portion 84 between the first end portion 80 and the dome end portion 78. The sealing surface 88 extends transversely relative to the central axis 86. The sealing surface 88 is provided to seal the leakage between the combustion chamber 18 and the cooling fluid passages 44. The sealing surface 88 engages the surface area 20 located adjacent a bore 92 disposed in the cylinder head 14. The bore 92 opens into the combustion chamber 18 and receives the second end portion 82. The bore 92 enables the dome end portion 78 to extend into and be exposed to the combustion chamber 18.

The third body portion 26 has a pre-combustion chamber 94 disposed therein. The pre-combustion chamber generally has the same shape as that of the third body portion 26 and opens at the first end 76 of the third body portion 26. As shown, an end portion 90 of the pre-combustion chamber 94 is disposed in the second body portion 24 and opens at the second end 62 of the second body portion 24. A plurality of spaced apart radially oriented orifices 96 are disposed in the dome end portion 78. The orifices 96 open into the pre-combustion chamber 94 and into the combustion chamber 18 of the engine 16. The orifices direct the expanding gasses from the pre-combustion chamber 94 in a predetermined pattern into the combustion chamber 18.

The third body portion 26 is made from a high temperature material. In particular, a high temperature, thermally stable and environmentally resistant alloy, such as, Haynes 230, manufactured by Haynes International, Inc. of Kokomo Ind., is the desired choice. This alloy is a nickel-chromium-tungsten-molybdenum alloy that combines high temperature strength, resistance to oxidizing environments up to 2100 degrees F. (1149 degrees centigrade), resistance to nitriding environments, and long term thermal stability. It is to be understood that other high temperature materials of suitable composition may be substituted without departing from the invention. The third body portion 26 may be cast or machined from bar stock.

The first body portion 22, the second body portion 24 and the third body portion 26 are connected together to form the pre-combustion chamber assembly 10. In particular, the second end 30 of the first body portion 22 is connected to the first end 60 of the second body portion 24 and the second end 62 of the second body portion 24 is connected to the first end 76 of the third body portion 26.

The second end 30 of the first body portion 22 is connected to the first end 60 of the second body portion 24 by a brazing material of a suitable composition capable of withstanding the environment (temperature, chemical and mechanical loading) in which it is exposed. For example, a silver-nickel braze material is suited for such an application. The collar portion 54 receives the cylindrical first end portion 64 of the second body portion 22 substantially co-axially therein. The collar portion 54 is radially spaced from the first end portion 64 of the second body portion 24 a preselected distance sufficient to receive the flowing braze material therebetween during the brazing process and to provide strength, rigidity and the required relative positioning of the first and second body portions 22,24. It should be noted that the sparkplug receiving bore 46 and the counter-bore portion 70 are axially aligned and substantially the same diameter.

The second end 62 of the second body portion 24 abuts and is connected to the first end 76 of the third body portion 26 by a controlled depth penetration weld, for example, a laser or electron beam weld, disposed about the pre-combustion chamber 10 at a juncture of contact between the first and second ends 76,62. A controlled depth penetration weld is utilized in order to accurately control the depth of penetration, maximize the depth of penetration, and provide adequate weld strength. The depth of penetration is between 4 to 4.5 millimeters at the juncture of contact. The wall thickness at this juncture is about 5 millimeters. The cylindrical second end portion 65 of the second body portion 24 and the cylindrical first end portion 80 of the third body portion 26 are substantially the same diameter and axially aligned.

As best seen in FIGS. 3–5, a sparkplug cooling passageway 98 is disposed in the second body portion 24 at a predetermined radial location spaced from and about the threaded bore portion 68. The sparkplug cooling passageway 98 is adapted to pass cooling fluid flow in close proximity relative to the threaded bore portion 68. The sparkplug cooling passageway 98 is defined by first and second spaced apart side surfaces 100,102 radially spaced from the stepped bore 66. The sparkplug cooling passageway 98 is also defined by first and second spaced apart end surfaces 104,106. The first and second end surfaces 104,106 are transverse to and connected to the first and second side surfaces 100,102. The spark plug cooling passageway 98 is substantially rectangular in shape.

The first and second side surfaces 100,102 and first and second end surfaces 104,106 are located, in an axial direction relative to the stepped bore 66, between the sealing and the pre-combustion chamber end surfaces 71,90. The sealing and pre-combustion chamber end surfaces 71,90 are spaced apart. The first side surface 100 is substantially parallel to the longitudinal axis of the stepped bore 66 and is spaced a preselected radial distance from the threaded bore 68. The first side surface 100 and defines a cylindrical wall 112 of the second body portion 24 radially about the longitudinal axis and relative to the threaded bore 68. The first end surface 104 is closely adjacent and spaced from the pre-combustion chamber end surface 71 a preselected distance.

The second body portion 24 has a plurality of spaced apart openings 108 disposed therein. The openings 108 are adapted to pass cooling fluid flow into the sparkplug cooling passageway 98. The first and second end surfaces 104 extend radially relative to said longitudinal axis of the stepped bore 66 to define spaced apart end surfaces 110 of the openings 108. The spaced apart openings 108 extend through and intermittently interrupt the second side surface 102.

The fuel passing passageway 74 disposed in the second body portion 24 opens at the pre-combustion chamber end surface 90 and the first end 60 of the second body portion 24 which is opposite the end surface 90. The fuel passing passageway 74 is radially spaced from the stepped bore 66. The sparkplug cooling passageway 98 is located between the fuel passageway 74 and the stepped bore 66.

The second body portion 24 is disposed in the cylinder head cooling passageway 44. The openings 108 in the second body portion are open to the cylinder head cooling passageway 44 and adapted to pass a cooling fluid flow between the cylinder head cooling passageway 44 and the sparkplug cooling passageway 98.

Industrial Applicability

With reference to the drawings, and in operation, the sparkplug cooling passageway 98, facilitates cooling of the second body portion 24 at a location in close proximity to the threaded bore portion 68 of the stepped bore 66. The cooling fluid flowing in the cooling fluid passageway 44 of the cylinder head transfers heat from the sparkplug 50 screwthreadably disposed in the threaded bore portion 68 by way of conduction. Thus, the temperature of the sparkplug 50 at the electrode end portion of the sparkplug is reduced. This reduction equates to increased sparkplug life and reduced engine down time.

The openings 108 disposed in the second body portion 24 pass cooling fluid flow circulated in the cylinder head 14 between the passageway 44 and the sparkplug cooling passageway 98. The cooling fluid flow circulated in the cylinder head is cooled in a conventional manner, such as by a radiator (not shown). Because the sparkplug cooling passageway 44 is located as described above, in close proximity to the threaded bore portion 68, the heat transfer to the cooling fluid is efficient. The radially measured wall thickness between the threaded bore portion 68 and the first side surface 100, and the axial length of the first side surface 100 establishes the amount of surface area open to the cooling fluid and the heat transferring potential.

A preselected spacing between the first and second side surfaces 100,102 and the preselected spacing between the first and second end surface 104,106 determines the cross-sectional area of the sparkplug cooling passageway 98 and establishes the cooling fluid flow capacity within the passageway 98. These dimensions are selected based on mechanical constraints and cooling needs.

The sparkplug cooling passageway 98 also serves to cool the second body portion 24 at the pre-combustion chamber end surface 90 and further extends the life of the second body portion 24. The first end surface 104 is placed at a preselected distance from the pre-combustion chamber end surface 90 in order to maximize heat transfer from the end surface 90 and cooling thereof.

The position of the sparkplug cooling passageway 98 between the threaded bore portion 68 and the fuel passing passageway 74, as described, maintains this area at a reduced temperature and stabilizes the temperature of the fuel being delivered to the combustion chamber.

The cooled pre-combustion chamber assembly being made from three different materials (as set forth above), based on the operating environment (temperature and chemical) to which it is exposed, maximizes the life of the cooled pre-combustion chamber and reduces the cost thereof. It should be recognized that the temperature and chemical conditions in the pre-combustion chamber 94 of the third body portion 26, where combustion of fuel takes place, requires a different material than that of the second body portion 24, where fuel is disbursed by the fuel passing passageway 74 and the sparkplug 50 is held in position. The first body portion 22, which is exposed to the lowest temperatures requires the least exotic material. Brazing of the first and second body portions together and control depth penetration welding of the second and third body portions makes possible the assembly of the three different materials. It should be recognized that the sparkplug cooling fluid passageway 98 contributes to a lower operating temperature of the second body portion 24 and contributes to the selection of a lower operating temperature material.

Other aspects, objects and advantages of this invention can be obtained from a study of the drawings, the disclosure and the appended claims.

We claim:

1. A cooled pre-combustion chamber assembly for an internal combustion engine, comprising:

a first body portion having a sparkplug receiving bore;

a second body portion having a stepped bore disposed therein, said stepped bore having a counter bore portion, a threaded bore portion and a longitudinal axis, said second body portion being axially aligned with said sparkplug receiving bore;

a third body portion having a pre-combustion chamber located within, said second body portion being located between said first and third body portions and said stepped bore being open to said sparkplug receiving bore and said combustion chamber; and a sparkplug cooling passageway disposed in said second body portion at a predetermined radial location spaced from and about the threaded bore portion, said sparkplug cooling passageway being adapted to pass cooling fluid flow in close proximity relative to the threaded bore portion.

2. The cooled pre-combustion chamber assembly, as set forth in claim 1, wherein said sparkplug cooling passageway being defined by first and second side surfaces radially spaced from the stepped bore.

3. The cooled pre-combustion chamber assembly, as set forth in claim 2, wherein said second body portion having a sealing surface and a pre-combustion chamber end surface, said sealing and pre-combustion chamber end surfaces being spaced apart, said threaded bore portion opening at said sealing surface and said pre-combustion chamber end surface, said sparkplug cooling passageway being defined by first and second spaced apart end surfaces, said first and second end surfaces being transverse to and connected to the first and second side surfaces, said first and second side surfaces and said first and second end surfaces being located between the sealing and the pre-combustion chamber end surfaces.

4. The cooled pre-combustion chamber assembly, as set forth in claim 3, wherein said second body portion having an opening disposed therein, said opening being adapted to pass cooling fluid flow into said sparkplug cooling passageway.

5. The cooled pre-combustion chamber assembly, as set forth in claim 4, wherein said first and second end surfaces extend radially relative to said longitudinal axis of the stepped bore to define spaced apart end surfaces of the openings.

6. The cooled pre-combustion chamber assembly, as set forth in claim 4, wherein said first side surface is substantially parallel to the longitudinal axis of the stepped bore.

7. The cooled pre-combustion chamber assembly, as set forth in claim 4, wherein said first side surface being spaced a preselected radial distance from the threaded bore and defines a cylindrical wall of the second body portion radially about the longitudinal axis and relative to the threaded bore.

8. The cooled pre-combustion chamber assembly, as set forth in claim 7, wherein said second body portion having first end opposite said pre-combustion chamber end surface and including a fuel passageway disposed in said second body portion and opening at the first end and at the pre-combustion chamber end surface, said fuel passageway being radially spaced from the stepped bore and said sparkplug cooling passageway being located between the fuel passageway and the stepped bore.

9. The cooled pre-combustion chamber assembly, as set forth in claim 4, wherein said first second and third body portions are each constructed of a different metallic material.

10. The cooled pre-combustion chamber assembly, as set forth in claim 9, wherein said first and second body portions being joined together by brazing and the second and third body portions being joined together by controlled depth penetration welding.

11. The cooled pre-combustion chamber assembly, as set forth in claim 4, including a cylinder head having a cylinder head cooling passageway disposed therein, said second body portion being disposed in the cylinder head cooling passageway, said opening in the second body portion being open to said cylinder head cooling passageway and being adapted to pass a cooling fluid flow between the cylinder head cooling passageway and the sparkplug cooling passageway.

12. The cooled pre-combustion chamber assembly, as set forth in claim 11, including a sparkplug screw threadably disposed in the threaded bore portion, said sparkplug being cooled by the cooling fluid in the sparkplug cooling passageway.

13. The cooled pre-combustion chamber assembly, as set forth in claim 3, wherein said second body portion having a plurality of spaced openings disposed therein, said openings being adapted to pass cooling fluid flow into said sparkplug cooling passageway.

* * * * *